June 13, 1944.  C. E. WALLING  2,351,246
UNIVERSAL HEAD FOR MACHINE TOOLS
Filed Sept. 11, 1943
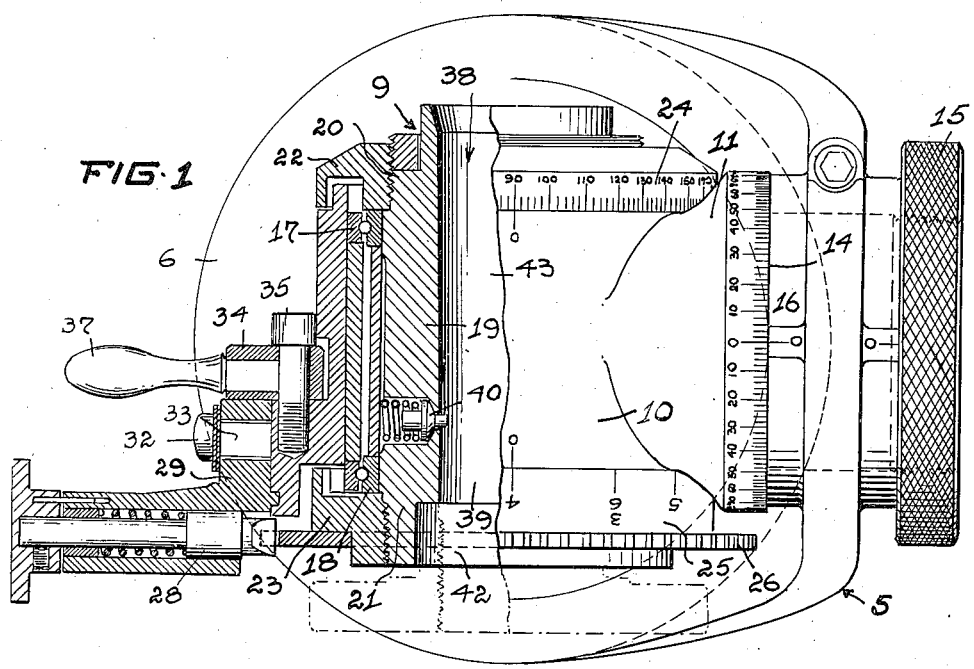
INVENTOR.
CLYDE E. WALLING Patented June 13, 1944

2,351,246

UNITED STATES PATENT OFFICE 2,351,246

UNIVERSAL HEAD FOR MACHINE TOOLS

Clyde E. Walling, Cleveland, Ohio

Application September 11, 1943, Serial No. 502,057

6 Claims. (Cl. 51—216)

This invention relates in general to improvements in fixtures for machine tools and is a continuation in part of my pending application Ser. No. 357,436 filed September 19, 1940, for improvements in universal heads for machine tools and tool grinding machines.

The general object of the invention is the provision of an improved universal head or tool support for mounting all forms of cutters, such as milling cutters, beveled cutters, straight or tapered reamers, either directly on their shanks or on arbors.

Another object of the invention is an improved, simple and sturdy universal head or tool support for machine tools which embodies a work supporting quill mounted for indexed axial rotation and axial tilting in a vertical plane arranged to rotate about an axis intersecting the axis of said quill for quick and accurate setting of a work piece mounted in the tool support with respect to cutting and grinding members of a machine tool.

A further object of the invention is a universal head or tool support of the type described, which is provided with special means for quick fine adjustment of the indexed setting of its quill by controlled rotation of the quill between adjoining index positions set so as to properly adjust a tool mounted on the support with respect to the cutting or grinding members of a machine tool without disturbance of the indexed setting of the quill of the tool support.

Still another object of the invention is the provision of a universal head or tool support of the type described, in which the quill has one part of its bore cylindrically shaped and has extended into this part of the bore a spring-pressed retractable key member to permit proper mounting of straight pull-in collets in this part of the bore of the quill and in which the quill has the other part of its bore tapered to permit proper mounting of tapered collets when the key member is yieldingly forced into retracted position.

A still further object of the invention is the provision of a universal head or tool support of the type described which, in addition to customary graduations for proper settings of the tool support includes a scale marked to show consecutive index positions of the quill for different cutting tools having different numbers of cutting edges, all for the purpose of simplimying manual indexing and eliminating the danger of faulty indexing.

In addition, the invention has certain other marked superiorities which radically distinguish it from presently known structures. These improvements or superiorities embodying certain novel features of construction are clearly set forth in the following specification and the appended claims; and a preferred form of embodiment of the invention is hereinafter shown with reference to the accompanying drawing forming part of the specification.

In the drawing:

Fig. 1 is a plan-view, partly in section, of a universal head or tool support constructed in accordance with the invention;

Fig. 2 is a front-view, partly in section, of the universal head or tool support shown in Fig. 1;

Fig. 3 is a fragmentary rear-view of the universal head showing the adjustment means for fine adjustment of the axial rotation of the quill between adjoining teeth of the index plate for the quill.

Referring now to the exemplified form of the invention shown in the drawing, reference numeral 2 denotes a circular base plate, the peripheral surface of which is graduated in degrees around its entire circumference. This base plate has extended from its lower surface guiding blocks or fingers 3 adapted to guide said plate in the T-slot of a machine and may be secured, as customary, to a machine tool table by means of a T-bolt (not shown) extended through its central bore 4. Base plate 2 rotatably mounts an angle bracket 5 which rests with its circular bottom plate 6 on said base plate and carries a horizontally arranged sleeve member 7 connected to the bottom plate by a web 8. The axis of sleeve member 7 and plate 6 are rectangularly related to each other and intersect each other and, in addition, sleeve member 7 is laterally offset with respect to the axis of plate 6 to permit rotatable support of a graduated T-shaped barrel member 9 in said sleeve member in such a fashion that the axis of said barrel intersects the axis of base plate 2.

Barrel member 9 embodies a barrel 10 and a cylindrical portion 11 laterally extended from said barrel at a right angle with respect thereto. This portion has its end 12 reduced to form a circular shoulder 14 contacting the side of sleeve member 7 and preventing rotation of the barrel member when threaded ring member 15 is tightly screwed upon the threaded end thereof and is circumferentially graduated adjacent to shoulder 14 to permit of proper and accurate setting of the barrel member with respect to a mark 16 on sleeve member 7.

The barrel 10 axially rotatably mounts in ball bearings 17 and 18 a quill 19 which carries upon its opposite threaded ends 20 and 21 collar members 22, 23, adapted to prevent axial shifting of the quill in barrel 18. These collar members are circumferentially graduated with scales 24 and 25 to facilitate indexing of the quill, as will be described hereinafter. Collar member 23 carries secured thereto by screws 27 a toothed index ring 26 which cooperates with a spring-pressed plunger 28 in arresting the quill in the desired index position. This plunger is shiftably mounted on barrel 10 to permit fine adjustments of the index settings of the quill. Thus, plunger 28 is mounted on a curved bracket 29 which is guided on an elevated rib 30 of barrel 10. This bracket is held in proper working position with respect to rib 30 by leaf springs 31 forced into engagement with said bracket by screws 32 which are extended through a slot 33 in bracket 29 and threaded into the body of barrel 10. This arrangement permits limited shifting of the plunger 28 and therewith slight rotary adjustment of the quill in barrel 10 by an eccentric 34 pivoted to the body of the barrel by a screw 35. This eccentric 34 rides in a recess 36 of bracket 29 and when rotated in one or the other direction by its handle member 37 effects shifting of the bracket within the limits defined by the slot 33 in said bracket.

Adjustment operations for the quill can be effected only when spring-pressed plunger 28 is engaged with the toothed index gear and transmits movements of bracket 29 to said quill.

The quill 19 which mounts the tools to be ground can be used for supporting straight pull-in collets or shafts and tapered collets or shafts. For such purpose, one part of the bore 38 of the quill is straight as at 39 and quill 19 in its wall at this part of the bore mounts a spring-pressed key member 40 which retractably extends into the straight bore, and another part of the bore 38 is tapered as at 43 to fit tapered shanks or collets of either the Morris taper or any other taper according to the taper of bore 41. Finally, the bore of the quill is recessed at its smaller end as at 42 to permit use of a pull-in collar such as shown in dash-dotted lines in Fig. 1 of the drawing.

The described universal head or tool support permits quick and easy mounting of a tool and quick and easy setting of the tool to the desired angle by rotating angle bracket 5 with respect to base plate 2, rotating the barrel member 9 with respect to the angle bracket, rotating the quill 19 in barrel 10, locking the quill by engaging plunger 28 with toothed index ring 26 and adjusting the set of the quill by adjustment of the plunger supporting bracket 29. When thus set scale 24 indicates the angular relationship between two settings of the quill and scale 25 having marked thereon the settings for tools with three, four, five and six cutting edges indicates the indexing points for the respective tools.

Having thus described my invention, what I claim is:

1. In a universal tool supporting head for machine tools a rotatable support including a sleeve member rectangularly related to the axes of rotation of said support, a T-shaped barrel member rotatably mounted in said sleeve member so that the axis of the barrel of said barrel member tilts in a plane through the axis of rotation of said support, a quill axially rotatably mounted in said barrel, means to arrest rotation of said quill and means supporting said arresting means on said barrel for limited movement with respect thereto to effect proper adjustment of the quill in said barrel without disconnecting the said arresting means when coupled with said quill.

2. In a universal tool supporting head for machine tools, a rotatable support including a sleeve member rectangularly related to the axis of rotation of said support, a T-shaped barrel member rotatably mounted in said sleeve member so that the axis of the barrel of said barrel member tilts in a plane through the axis of rotation of said support, a quill axially rotatably mounted in said barrel, means on said barrel for indexing said quill, and means shiftably mounting said indexing means for adjustment within predetermined limits without interference with the said indexing means and their relation with respect to said quill.

3. In a universal tool supporting head for machine tools a rotatable support including a sleeve member rectangularly related to the axis of rotation of said support, a T-shaped barrel member rotatably mounted in said sleeve member so that the axis of the barrel of said barrel member tilts in a plane through the axis of rotation of said support, a quill axially rotatably mounted in said barrel, means for indexing rotation of said quill including a spring-pressed plunger and an indexing gear, and means shiftably mounting said plunger for shifting same within predetermined limits with respect to said barrel member to finely adjust the position of said quill in said barrel without interference with the plunger when engaged with said indexing gear.

4. In a universal tool supporting head for machine tools a rotatable support including a sleeve member rectangularly related to the axis of rotation of said support, a T-shaped barrel member rotatably mounted in said sleeve member so that the axis of the barrel of said barrel member tilts in a plane through the axis of rotation of said support, a quill axially rotatably mounted in said barrel, means for indexing rotation of said quill including a spring-pressed plunger and an indexing gear, means shiftably mounting said plunger for shifting same within predetermined limits with respect to said barrel member, and rotary cam means engaged with said shiftable mounting means for said plunger to finely adjust the position of said quill in said barrel without interference with the plunger when engaged with said indexing gear.

5. A universal tool supporting head for machine tools as described in claim 1, wherein the axially rotatable quill includes a bore having a cylindrical portion and a spring-pressed key member extended through the wall of said quill into said portion, and having a tapered portion to support in said quill straight pull-in collars and shanks and tapered collars and shanks.

6. A universal tool supporting head for machine tools as described in claim 1, wherein the axially rotatably mounted quill in said barrel is threaded at its opposite ends and has secured thereto flanged, circumferentially graduated collar members adapted to prevent axial shifting of said quill in said barrel and effect proper setting and indexing of said quill.

CLYDE E. WALLING.